United States Patent
Schulz et al.

(10) Patent No.: US 10,220,344 B2
(45) Date of Patent: Mar. 5, 2019

(54) FILTER CARTRIDGE COMPRISING A WELD SEAM

(71) Applicant: Carl Freudenberg KG, Weinheim (DE)

(72) Inventors: Karsten Schulz, Neckarbischofsheim (DE); Georg Hirsch, Ubstadt-Weiher (DE); Andreas Krahmer, Mannheim (DE); Rainer Kaffenberger, Reichelsheim (DE); Hans Wiegand, Fuerth (DE)

(73) Assignee: CARL FREUDENBERG KG, Weinheim (DE)

( * ) Notice: Subject to any disclaimer, the term of this patent is extended or adjusted under 35 U.S.C. 154(b) by 10 days.

(21) Appl. No.: 15/214,485

(22) Filed: Jul. 20, 2016

(65) Prior Publication Data

US 2017/0021299 A1  Jan. 26, 2017

(30) Foreign Application Priority Data

Jul. 21, 2015 (EP) .................................. 15177740

(51) Int. Cl.
| | |
|---|---|
| *B01D 29/21* | (2006.01) |
| *B01D 46/52* | (2006.01) |
| *B01D 46/00* | (2006.01) |
| *B01D 29/11* | (2006.01) |
| *B01D 29/23* | (2006.01) |
| *B01D 29/33* | (2006.01) |

(52) U.S. Cl.
CPC .......... *B01D 46/522* (2013.01); *B01D 29/111* (2013.01); *B01D 29/21* (2013.01); *B01D 29/232* (2013.01); *B01D 29/333* (2013.01); *B01D 46/0001* (2013.01); *B01D 46/521* (2013.01); *B01D 2275/206* (2013.01)

(58) Field of Classification Search
CPC .......... B01D 2275/206; B01D 46/0001; B01D 46/521; B01D 46/522; B01D 29/111; B01D 29/21; B01D 29/232; B01D 29/333; B01D 46/01
USPC ........ 55/521, 529, DIG. 5; 210/493.1, 493.5
See application file for complete search history.

(56) References Cited

U.S. PATENT DOCUMENTS

| | | | | |
|---|---|---|---|---|
| 4,301,012 A | * | 11/1981 | Puckett | ............... B01D 29/21 |
| | | | | 210/457 |
| 4,419,241 A | * | 12/1983 | Hoffmann | ............ B01D 29/111 |
| | | | | 210/493.5 |
| 4,588,464 A | * | 5/1986 | Miyagi | ................ B01D 29/111 |
| | | | | 156/218 |
| 4,735,720 A | * | 4/1988 | Kersting | ............... B01D 29/111 |
| | | | | 210/493.5 |

(Continued)

FOREIGN PATENT DOCUMENTS

| | | |
|---|---|---|
| DE | 10135421 A1 | 2/2003 |
| DE | 202010005861 U1 | 8/2011 |

(Continued)

*Primary Examiner* — Frank M Lawrence, Jr.
(74) *Attorney, Agent, or Firm* — Leydig, Voit & Mayer, Ltd.

(57) ABSTRACT

A filter cartridge has a folded filter medium that is formed into a prism at least in regions and comprises two interconnected end folds, and which filter cartridge is constantly or cyclically subjected to stresses, specifically subjected to stresses from dedusting by means of pressure surges, is characterized in that the end folds overlap one another.

20 Claims, 5 Drawing Sheets

(56) References Cited

U.S. PATENT DOCUMENTS

| | | | | |
|---|---|---|---|---|
| 5,114,508 | A | * 5/1992 | Miyagi | B01D 29/111 |
| | | | | 156/69 |
| 5,207,812 | A | * 5/1993 | Tronto | B01D 29/111 |
| | | | | 55/498 |
| 6,949,155 | B1 | * 9/2005 | Lang | B01D 29/012 |
| | | | | 156/203 |
| 7,674,307 | B2 | * 3/2010 | Solberg, Jr. | B01D 46/0001 |
| | | | | 55/497 |
| 2004/0173303 | A1 | 9/2004 | Altmeyer et al. | |
| 2005/0284807 | A1 | * 12/2005 | Mees | B01D 29/111 |
| | | | | 55/486 |
| 2011/0252757 | A1 | * 10/2011 | Olson | B01D 46/0068 |
| | | | | 55/486 |
| 2011/0265651 | A1 | * 11/2011 | Steiner | B01D 46/0058 |
| | | | | 95/279 |
| 2013/0015121 | A1 | * 1/2013 | Mees | B01D 29/111 |
| | | | | 210/497.01 |

FOREIGN PATENT DOCUMENTS

| | | |
|---|---|---|
| DE | 102012015876 A1 | 5/2014 |
| EP | 2535550 A2 | 12/2012 |
| GB | 2294649 A | 5/1996 |

\* cited by examiner

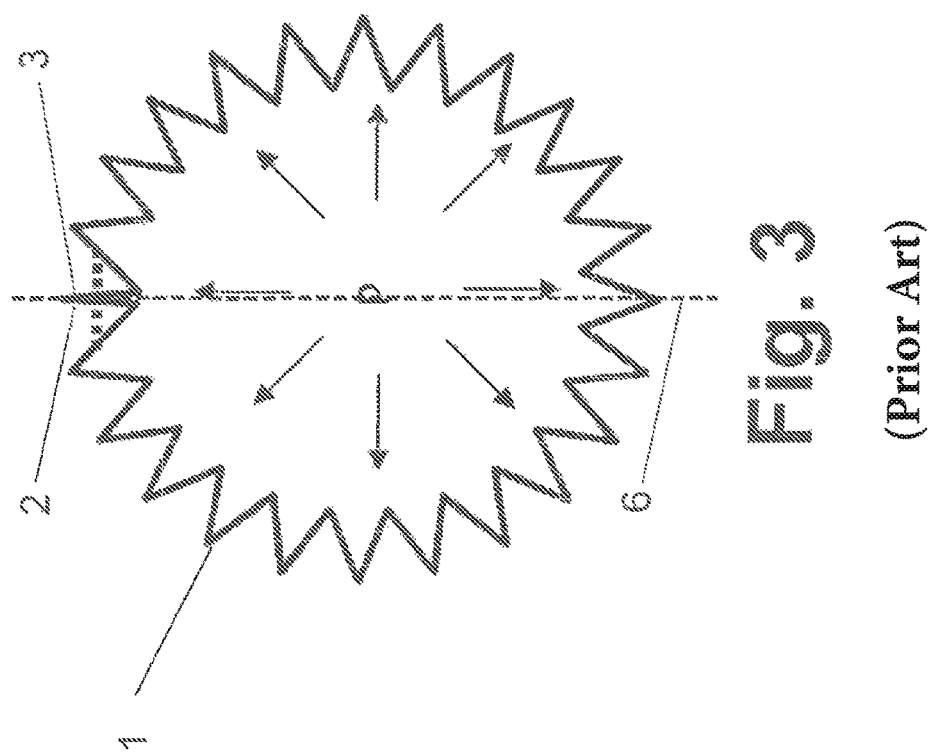

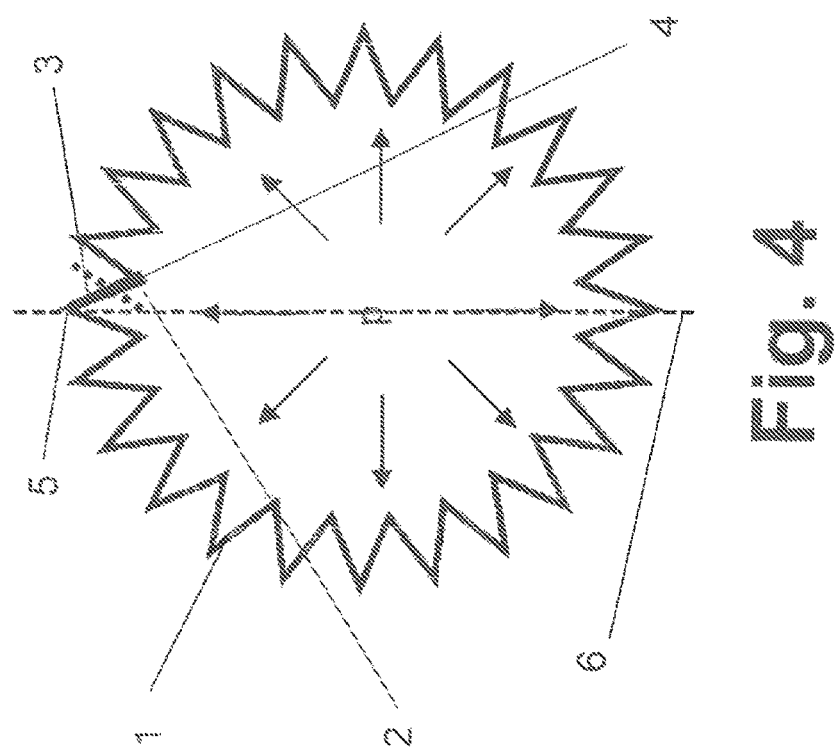

FILTER CARTRIDGE COMPRISING A WELD SEAM

CROSS-REFERENCE TO RELATED APPLICATIONS

Priority is claimed to European Patent Application No. 15 177 740.6, filed on Jul. 21, 2015, the entire disclosure of which is hereby incorporated by reference herein.

FIELD

The invention relates to a filter cartridge.

BACKGROUND

Filter cartridges comprise a filter medium that surrounds a cavity. The cavity has at least one opening into which compressed air can be blown. The filter cartridges comprise a pleated or folded filter medium that can be welded or glued at end regions to form a prismatic body.

Filter cartridges of this kind for filtering air contain, as a core part, a filter medium arranged in the shape of a star that is assembled from a flat medium. In addition to the folding or pleating and the fold orientation, a significant process step in the assembly is that of joining the end folds of a planar concertina to form a prism.

A filter cartridge can have a relatively low resistance to pressure surges if two end folds are glued together "back-to-back" and extend together in the radial direction, as shown in FIG. 1.

Although DE 10 2012 015 876 A1 and DE 101 35 421 A1 disclose ultrasonic welding methods, experiments have shown that ultrasonically welded end folds that are "back-to-back" have mechanical strength properties that do not meet the requirements and mechanical strength properties that can be achieved by gluing.

Although gluing techniques for joining overlapping end folds of concertinas are known, there is a need to be able to use overlapping of this kind in a reliable manner.

In this case, technically reliable joining of the filter medium must be achieved and ensured since, in use, said join is subjected to mechanical stresses, sometimes over several years.

In practice, very varied filter media are used, depending on the purpose of the filtration. A corresponding method for joining the end folds must therefore make it possible to reliably process different filter media having in part very different physical properties. Joining of this kind can be achieved by means of adhesive technology.

SUMMARY

An aspect of the invention provides a filter cartridge, comprising: a folded filter medium, formed into a prism at least in regions, wherein the folded filter medium includes a first and a second interconnected end fold, wherein the first and second end folds overlap one another.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a schematic view of the pressure distribution during dedusting by means of pressure surges, a weld seam being subjected to a combination of peeling stress and cracking stress during dedusting, and FIG. 4 is a schematic view of the pressure distribution during dedusting by means of pressure surges, a weld seam being subjected to tensile stress during dedusting.

DETAILED DESCRIPTION

Figure 1:
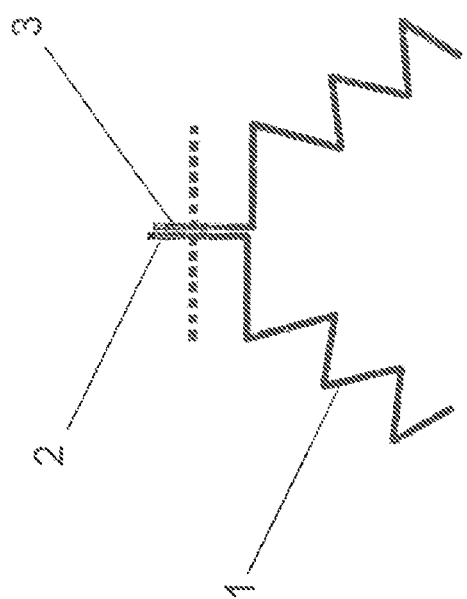
FIG. 1 is a schematic view of a welded joint in which two end folds are back-to-back.

An aspect of the invention is that of achieving secure joining of the end folds of a filter cartridge that is constantly or cyclically subjected to stresses, specifically subjected to stresses from dedusting by means of pressure surges.

According to an aspect of the invention, it has been found that ultrasonic welding can be suitable for joining end folds of a filter cartridge only if the end folds are suitably arranged. It was then found that, in a pulsed ultrasonic welding method, a "flying" anvil must be used in an ultrasonic welding plant in order to remove finished filter cartridges therefrom, without this causing any problems. Specifically, the anvil is necessary in order to provide an opening in one side of the ultrasonic welding plant. A 360°-closed star-shaped filter geometry that is produced by overlapping end folds can be removed or ejected through this opening.

The ultrasonic welding plant is loaded and the material is manipulated by means of suitable material guides and fixings. In a continuous ultrasonic welding method, a free-arm device can be used in order to supply the two end folds, in an overlapping manner, to the ultrasonic welding plant and in order to be able to remove the 360°-closed filter cartridge after joining said end folds.

Within the meaning of this document, the term "360°-closed" is intended to indicate that a concertina of the filter cartridge is closed all around over the entire periphery thereof. In this case, according to the invention, the end folds of the concertina are not "back-to-back".

Up to now, ultrasonic welding has always been carried out from the outside if the end folds are "back-to-back", since this is significantly easier to achieve on account of lesser technical complexity of the machines and plants used for this purpose.

The end folds can be welded together. An integral bond of the end folds can be achieved thereby.

The end folds can be ultrasonically welded together. Ultrasonic welding methods can be carried out quickly and cheaply.

The end folds can form a wall of a point of the folded filter medium. As a result, the assembly of overlapping end folds does not project radially outwards, but rather in a manner inclined relative to a radial direction. Consequently, the assembly of overlapping end folds is subjected to less stress when there is a pressure acting radially from the inside to the outside. A pressure of this kind can occur during dedusting by means of pressure surges.

The end folds can each have a depth that is less than the depth of the wall formed by the overlapping end folds. When manufacturing a concertina, the end folds are always produced having a smaller depth. This is due to the following reasons: the pleating device on the pleating plant can better detect the end of a concertina and can cut off the concertina in a controlled and accurate manner. If two end folds are glued or welded together in an overlapping manner, after gluing or welding, the wall resulting therefrom has the same depth as the remaining folds of the concertina that forms the prism. If the end folds were to have the same pleat depth as all the other folds of the concertina, folds that are glued or welded in an overlapping manner would form a wall that is higher than all the other walls, specifically that would project further outwards radially. This would be an optical defect. There could be problems during final assembly, for example when welding the concertina, formed into a prism, into covers and bases. Folding over could result in a skewed end fold. Uneven fold depths could make it problematic to apply external bands on account of the excess height of an individual point. The abovementioned cover and the base are preferably parallel to one another, but can also be arranged so as to be inclined towards one another in a prism that has been cut off obliquely.

The filter cartridge described here is suitable for all uses in industrial air filtration in which folded filter cartridges are used. The filter cartridge described here can in particular be used for dedusting or air filtration.

The filter cartridge described here can be used in all primary shaping and reshaping industrial production processes, such as casting, cutting or welding, since large amounts of dust are produced in these processes. This dust must be separated out of the air in order to protect people, the environment and also the machines.

In general, this is achieved by using suitable filters. When there are high concentrations of dust in the air, air filters that are to be dedusted are used for this purpose, for example having a cartridge design.

FIG. 4 shows a filter cartridge comprising a folded filter medium 1 that is formed into a prism and comprises two interconnected end folds 2, 3. The end folds 2, 3, overlap one another. The end folds 2, 3 are welded together. The end folds 2, 3 are ultrasonically welded together. The end folds 2, 3 form a wall 4 of a point 5 of the folded filter medium 1. The wall 4 is inclined relative to a radial direction.

Figure 2:
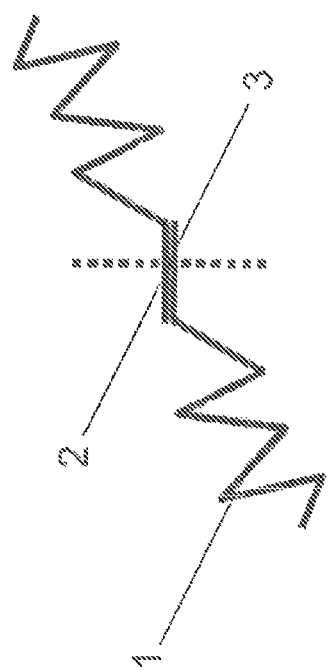
FIG. 2 is a schematic view of a welded joint in which two end folds overlap one another.
Figure 2A:
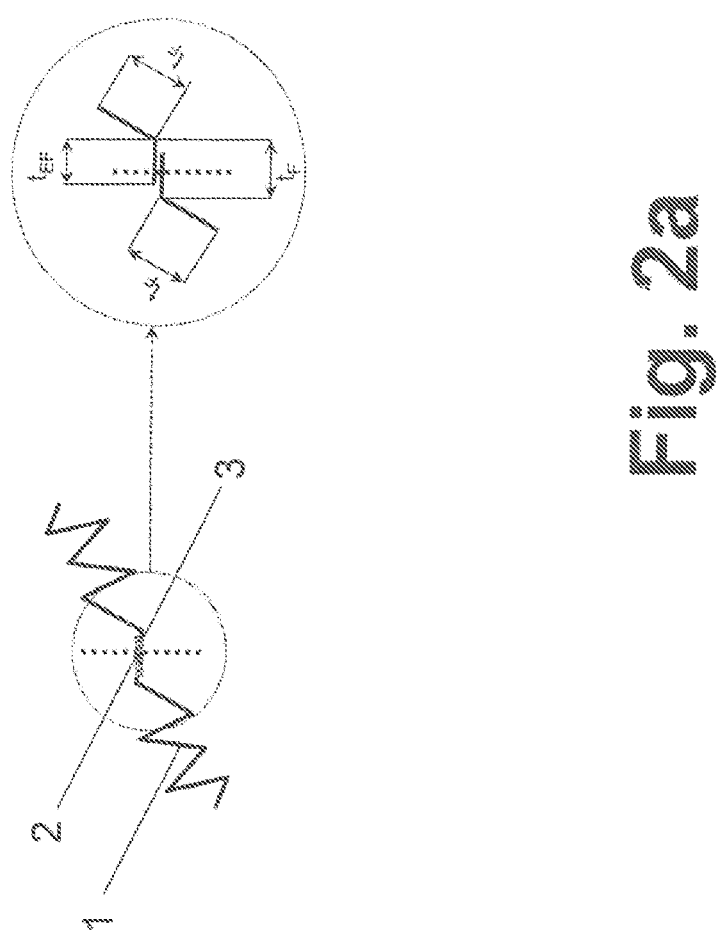
FIG. 2a is a schematic view of the welded joint according to FIG. 2, in which it is shown that the depth of the wall of a point formed by two end folds is greater than the depth of one end fold.

FIG. 2a shows that the end folds 2, 3 have depths $t_F$ that are smaller than the depth $t_{EF}$ of the wall 4 formed by the overlapping end folds 2, 3. In this respect, the end folds 2, 3 each have a depth that is smaller than the depth of the wall 4. The difference between the depth of the wall 4 and the depth of an end fold 2, 3 is preferably from one to ten millimeters.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A filter cartridge, comprising:
   a folded filter medium folded to include a plurality of folds including a first and a second end fold,
   wherein the folded filter medium is formed into a prism at least in regions with a plurality of radially projecting points so that the first and second end folds overlap one another, so as to form a wall of one of the plurality of points of the folded filter medium, and
   wherein the wall is inclined relative to a radial direction.

2. The cartridge of claim 1, wherein the first and second end folds are welded together.

3. The cartridge of claim 1, wherein the first and second end folds are ultrasonically welded together.

4. The cartridge of claim 1, wherein the first and second end folds each have a depth that is smaller than a depth of the wall.

5. The cartridge of claim 1, wherein the first and second end folds overlap one another, forming a 360° closed structure in a manner that is not back-to back.

6. The cartridge of claim 1, wherein the first and second end folds are welded together by pulsed ultrasonic welding.

7. The cartridge of claim 1, wherein a bond between the first and second ends is integral.

8. The cartridge of claim 1, wherein the wall has the same depth as remaining folds of a concertina that forms the prism.

9. The cartridge of claim 1, further comprising:
   an external band.

10. The cartridge of claim 1, wherein a cover and a base of the prism are parallel to one another.

11. The cartridge of claim 1, wherein a cover and a base of the prism are inclined towards one another.

12. The cartridge of claim 1, wherein a cover and a base of the prism are inclined towards one another and the prism is cut off obliquely.

13. An air filter system, comprising the cartridge of claim 1.

14. A method of separating dust from dust-containing air, the method comprising:
   contacting the air with the cartridge of claim 1.

15. A method, comprising:
   carrying out a primary shaping or reshaping of an object in the presence of the cartridge of claim 1.

16. A method, comprising:
   welding in the presence of the cartridge of claim 1.

17. A method, comprising:
   casting in the presence of the cartridge of claim 1.

18. A method, comprising:
   cutting an object in the presence of the cartridge of claim 1.

19. A method of making the cartridge of claim 1, comprising:
ultrasonic welding the first and second ends.

20. The method of claim 19, wherein the ultrasonic welding is pulsed.

\* \* \* \* \*